United States Patent [19]
Zeller et al.

[11] Patent Number: 4,821,016
[45] Date of Patent: Apr. 11, 1989

[54] STEERING WHEEL WITH AN ELECTRICAL LEAD TO A PROTECTIVE GAS BAG IMPACT INSTALLATION LOCATED IN THE STEERING BOWL OF AN AUTOMOTIVE VEHICLE

[75] Inventors: Gregor Zeller, Aschaffenburg; Helmut Bonn, Haibach, both of Fed. Rep. of Germany

[73] Assignee: Petri AG, Fed. Rep. of Germany

[21] Appl. No.: 124,376

[22] Filed: Nov. 20, 1987

Related U.S. Application Data

[63] Continuation of Ser. No. 842,949, Mar. 24, 1986, abandoned.

[30] Foreign Application Priority Data

Mar. 23, 1985 [EP] European Pat. Off. ........ 85103484.3

[51] Int. Cl.$^4$ ................................................ B60Q 9/00
[52] U.S. Cl. ..................................... 307/10.1; 116/31; 116/DIG. 21; 439/15
[58] Field of Search ............... 340/52 R; 116/31, 284, 116/DIG. 21; 180/255, 79; 74/484 R, 552; 403/1, 13, 14, 27; 29/407, 464; 200/61.54, 61.55; 439/15, 16

[56] References Cited

U.S. PATENT DOCUMENTS

| | | | |
|---|---|---|---|
| 2,957,442 | 10/1960 | Coon | 116/31 |
| 3,071,761 | 1/1963 | Branker | 116/31 |
| 3,673,561 | 6/1972 | Bronstein | 340/52 R |
| 4,013,034 | 3/1977 | Cantley et al. | 116/31 |
| 4,383,148 | 5/1983 | Arima et al. | 200/61.59 |

FOREIGN PATENT DOCUMENTS 3009109 2/1986 Fed. Rep. of Germany .

Primary Examiner—Joseph A. Orsino
Assistant Examiner—Brian R. Tumm
Attorney, Agent, or Firm—Robert J. Koch

[57] ABSTRACT

Steering wheel with an electric lead to a protective gas bag impact device located in the steering wheel bowl of an automotive vehicle including a current conductor formed by a conducting strip arranged with several windings within a fixedly mounted housing surrounded a steering wheel hub. One end of the cable terminates in a core fastened to the steering wheel hub while the other terminates in the housing. A disk toothed over at least part of its circumference is mounted on the housing and an actuating element engaging the toothed disk is mounted on the hub or spindle. The toothed disk is located radially in relation to the axis of the hub and the spindle and the actuating element is formed by a flange-like transport disk surrounding the spindle or the hub and equipped with a radial slot which is provided with bevelling in the area of the slot. The edges of the slot are spread to form an opening corresponding to the tooth division of the toothed disk. Alternatively, the toothed disk is arranged axially parallel to the spindle and the actuating element is formed by a pinion mounted of the axle of the spindle or hub. The axle of the toothed disk is coupled by a potentiometer to a display for visibly displaying the deflection of the steering assembly from the center position.

2 Claims, 1 Drawing Sheet

U.S. Patent  Apr. 11, 1989  4,821,016
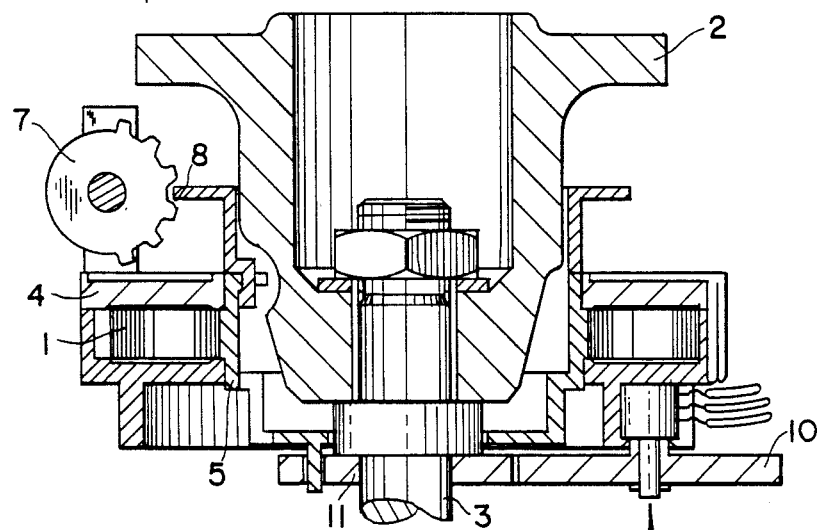
FIG. 1
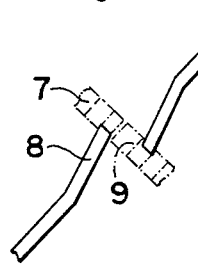
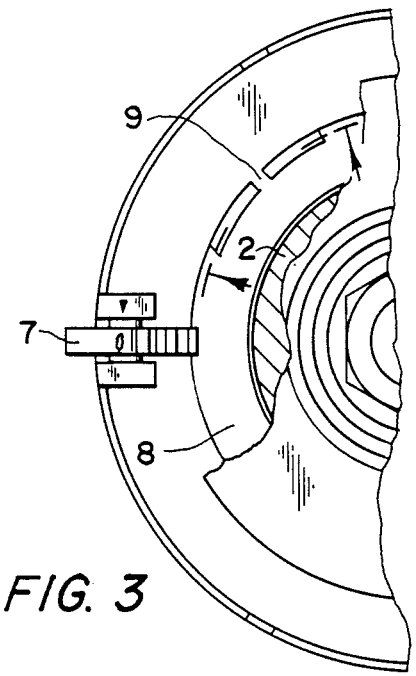
FIG. 3
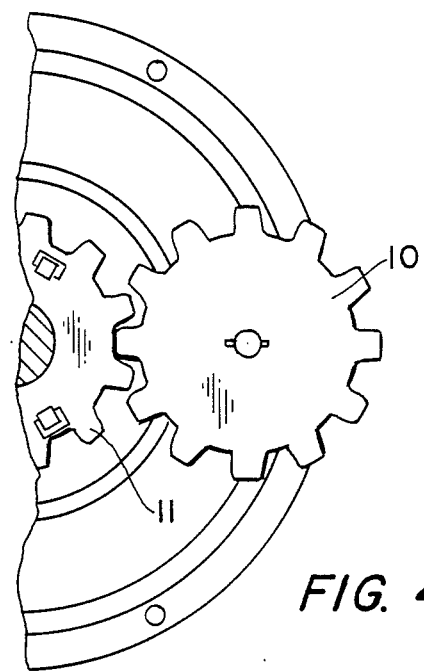
FIG. 4
FIG. 2

STEERING WHEEL WITH AN ELECTRICAL LEAD TO A PROTECTIVE GAS BAG IMPACT INSTALLATION LOCATED IN THE STEERING BOWL OF AN AUTOMOTIVE VEHICLE

This application is a continuation of application Ser. No. 842,949, now abandoned, filed Mar. 24, 1986.

This application is related to EP No. 85 1023404.4 corresponding to U.S. application Ser. No. 835,282 now U.S. Pat. No. 4,657,326, EP No. 85 103482.7 corresponding to U.S. application Ser. No. 842,948, now U.S. Pat. No. 4,714,430; EP No. 85 103483.5 corresponding to U.S. application Ser. No. 842,833 now U.S. Pat. No. 4,660,500. The disclosures of all of the above documents are expressly incorporated by reference herein.

BACKGROUND OF THE INVENTION

1. Field of the Invention

The invention relates to a steering wheel with an electric lead or cable to a protective gas bag impact installation located in the steering wheel bowl of an automotive vehicle. A current conductor formed by a conducting strip or ribbon cable arranged in several concentric windings in a housing surrounding a steering spindle and a steering wheel hub respectively, on end of said strip terminating in a core mounted on the hub of the steering wheel and rotating with the steering wheel and the other end terminating in a fixedly mounted housing.

2. Description of the Related Art

Current conductors such as those shown in DE-OS No. 30 09 109.9 have performed well in operation or actual use. Difficulties, however, arise from incorrect installation of the current connectors premounted on the steering wheel. The assembly and cable must be installed in the centered position with the wheels set for straight-line travel for the usual maximum deflection of the steering wheel of approximately six windings of the helical strip or cable. The maximum rotating angle of the steering wheel is shortened unilaterally upon unintentional accidental rotation of the housing relative to the core prior to the assembly. This can potentially cause an accident or breakage of the current connector, thereby inactivating the gas bag impact device. Consequently, prior to mounting the steering wheel on the steering column the position and alignment of the helical strip must always be carefully and individually inspected.

SUMMARY OF THE INVENTION

It is an object of the present invention to provide a steering wheel with a current connector of the above-described type, whereby the risk of an assembly error is reduced both during the initial installation and subsequent assembly following dismantling for maintenance. The invention comprises a disk exhibiting teeth over at least part of its circumference mounted on the fixedly mounted housing and an actuating element engaging the toothed disk mounted on the hub or the spindle.

The invention creates a steering wheel with a helical strip connector, whereby the position of the helical strip in the housing may be ascertained without difficulty and its position corrected in case of a misalignment. The center setting of the helical strip is correlated with a definite, optionally marked, position of the toothed disk in relation to the actuating element. The position therefore may be ascertained directly by visual inspection. Correspondingly, in case of a deflection, the alignment in the centered position in relation to the core, or following its installation on the hub in relation to said hub, may be effected under constant visual observation without preliminary testing.

In one embodiment of the invention, the toothed disk may be mounted radially with respect to the axis of the hub or the spindle and the actuating element may be formed by a flange-like transport disk surrounding the spindle or the hub. The disk is provided with a radial slot and bevelled in the area or the slot, whereby the edges of the slot are spread into an opening corresponding to the tooth division of the toothed disk. In this case, it is sufficient to equip the toothed disk with a number of teeth corresponding to the number of windings of the helical strip or rotations of the wheel and to align the centered position of the number of windings of the helical strip or rotations of the wheel and to align the centered position of the helical strip with the center of the teeth. A separate marking of the centered position may be omitted. Alternatively, the toothed disk may be arranged in an axially parallel manner in relation to the spindle. The actuating element is a pinion axially mounted on the spindle or hub. In this embodiment, the axle of the toothed disk may conveniently be connected to a potentiometer which is linked to a display device for visually indicating the deflection of the steering assembly. The setting is directly visible enabling alignment with the center position under visual observation.

BRIEF DESCRIPTION OF THE DRAWINGS

The invention is more apparent by reference to the example in the drawings. In the drawing:

FIG. 1 shows a section through a steering wheel hub with the aligning device according to the invention (two embodiments).

FIG. 2 shows a lateral elevation of the aligning device.

FIG. 3 shows a top view of the aligning device shown on the left in FIG. 1.

FIG. 4 shows a top view of the aligning device shown on the right in FIG. 1.

DETAILED DESCRIPTION OF THE PREFERRED EMBODIMENT

The steering wheel with an electric lead to a protective gas bag impact installation shown as an example in the drawing includes a current conductor formed essentially by a helical strip conductor 1 arranged in several concentric windings in a fixed mounted housing 4 surrounding the steering wheel hub and the steering spindle 3. One end of said strip or cable terminates in a core 5 fastened to the steering wheel hub and rotating therewith. The other end terminates in the fixedly mounted housing 4. In the embodiment shown in FIG. 1 (left side) and FIG. 2 and 3, a toothed disk 7 and a flange-like transport disk 8 surrounding the hub 2 as the actuating element are provided on the fixedly mountable housing 4 radially in relation to the hub and spindle axis. The disk 8 is equipped with a radial slot 9 and is bevelled in the area of the slot, whereby the edges of the slot are spread open into an opening X corresponding to the tooth division of the toothed disk.

In the alternative embodiment shown in FIG. 1 (right side) and in FIG. 4, the toothed disk 10 is arranged parallel to the axis of the spindle 3 and the actuating element is formed by a pinion 11 mounted coaxially on the spindle or hub, in which case both the toothed disk and the pinion must be provided with teeth over their entire circumference. The axle of the toothed disk 10 is connected by a potentiometer 12 to a display indicating the deflection of the steering assembly from the center position in a visible manner.

The operation of the installation is as follows:

In the center position of the helical strip conductor 1, the transport disk 8 engaging the toothed disk 7 is in the location shown in the drawing, between the two central teeth of the six shown in this embodiment. This position enables three rotations of the steering wheel to the right and the left. In the course of a full rotation of the steering wheel, the transport disk 8 arrives with its slot 9 in the area of the toothed disk 7. When passing over the slot, the toothed disk is initially rotated one-half of a tooth division by the unilateral bevelling whereupon the transport enters the adjacent tooth slit with the other bevelled portion. The position of the toothed disk 7 on the transport disk 8 therefore directly indicates the direction and number of rotations of a possible deflection of the helical strip conductor 1 from its center position.

In the alternative embodiment shown on the right side of FIG. 1 and in FIG. 4, wheel deflection may be correspondingly visualized. In contrast to the embodiment described above, a single rotation of the steering wheel leads to a full rotation of the pinion 11 and therefore to a rotation of the toothed disk 10 in accordance with the transmission ratio. The potentiometer 12 is connected to the axle of the toothed disk 10 and the display means joined to it again render the direction and number of rotations of the deflection directly visible, if properly calibrated. The potentiometer 12 may be a suitable multi-turn pot. Alignment is effected by corresponding opposing rotation of the housing in relation to the steering wheel hub 2 or the steering spindle 3.

We claim:

1. A steering wheel assembly comprising:
   a fixed housing member;
   a rotating steering unit surrounded by said fixed housing;
   means for indicating a relative rotational relationship between said fixed housing member and said rotating steering unit, including an at least partially toothed disk mounted on said fixed housing with an axis of rotation transverse to said rotating steering unit; and
   means for actuating said means for indicating including an annular flanged transport disk engaging said toothed disk and exhibiting a bevelled slot with an opening corresponding to a tooth division of said toothed disk mounted on said rotating steering unit.

2. A steering wheel assembly according to claim 1, further comprising means for electrical conduction arranged in a plurality of windings in an area between said fixed housing and said rotating steering unit and exhibiting an outer terminal end mounted on said fixed housing and an inner terminal end mounted on and rotating with said rotating unit.

* * * * *